United States Patent Office 3,402,075
Patented Sept. 17, 1968

3,402,075
ULTRASONIC WASHING
Seymore Goldwasser, Teaneck, Carl W. Haefele, Jr., Montvale, and Carl Padden, Bloomfield, N.J., assignors to Lever Brothers Company, New York, N.Y., a corporation of Maine
No Drawing. Filed Apr. 8, 1963, Ser. No. 271,470
5 Claims. (Cl. 134—1)

This invention relates to an improved method of washing articles by immersion in a washing bath to which ultrasonic energy is applied, and particularly, to methods of and detergents for washing articles efficiently at low temperature in water containing substantial amounts of dissolved air.

It is known that soiled articles, such as household dishes and the like, may be cleaned by immersing such articles in a cleaning bath while applying ultrasonic energy to the bath. In a typical system, a cleaning tank, holding a suitable amount of cleaning solution, is provided with a transducer attached to the bottom thereof. The transducer is designed so that its face, the tank bottom, is a point of maximum pressure. When the tank is filled with water to a depth which is an odd multiple of a quarter wave-length, a standing wave can be established. Once a standing wave has been established in the wash tank, conditions for maximum resonance have been met. Under resonating conditions, the energy supplied through the ultrasonic transducer is effective, under some conditions, to dislodge particles of soil from the article to be cleaned.

A difficult problem in using ultrasonic washing equipment in the home is created by the presence of dissolved air in fresh tap water. Dissolved air tends to be released on the application of ultrasonic energy, and forms a dispersion of fine bubbles throughout the washing solution. The bubbles diffuse and disperse the ultrasonic energy, thereby preventing maximum resonance from being achieved. A further complication is brought about by the temperature and pressure of the water. Air is more soluble at lower temperatures and at higher pressures and hence dissolved air does not interfere as much at high temperatures as at lower temperatures. At lower temperatures, more air is present in solution to leave the water and form bubbles, thereby dissipating ultrasonic energy and further reducing washing efficiency. Although the problem of dissolved air may be overcome by providing a deaeration period in the washing cycle, this is undesirable as the time required to wash the dishes is increased, and, furthermore, substantial amounts of power are required to drive the ultrasonic transducer during the deaeration period when little useful washing occurs.

Still another important problem is to provide a means of obtaining efficient washing over a wide temperature range. While many detergents including, for example, phosphates, commonly used as "builders" wash reasonably well in hot water, their washing efficiency is low at temperatures from 100° to 125° F. Inasmuch as high temperature water frequently is not available and the washing bath tends to cool significantly as time progresses, the above-mentioned detergents are not completely satisfactory. This unfavorable temperature effect on detergent efficiency further aggravates the problem of washing with ultrasonic equipment at low temperatures.

It has been thought, heretofore, that cavitation plays an essential role in the mechanism by which the ultrasonic energy operated to dislodge soil particles. Cavitation occurs as a result of the sound pressure wave in the liquid. The sound wave may be visualized approximately as a sine wave having a maximum and a minimum pressure traveling through the liquid. When the pressure wave is sufficiently strong, the low pressure peak will be less than the vapor pressure of the liquid. When this occurs minute vapor bubbles are formed. A half a cycle later when the pressure becomes high again, the vapor bubbles implode with great violence. While the quantity of energy in any one implosion is extremely small, it has been estimated that enormous pressures and high temperatures are developed. As mentioned, it has been thought that the formation and collapse of these vapor pockets operate to scrub or, in some manner, dislodge the soil particles from the article being cleaned.

Cavitation in ultrasonic cleaning is a function of the temperature of the water. At a relatively high temperature, such as 140° F., the vapor pressure of the water is sufficiently high that cavitation readily occurs at reasonable power inputs. At a lower temperature such as 115° F., cavitation does not occur at moderate power levels because of the relatively lower vapor pressure of the water. Lack of cavitation at low temperatures may be the reason that many compounds capable of washing efficiently at a high temperature are relatively ineffective at a low temperature.

An object of the present invention is to provide a method of washing in ultrasonic equipment without preliminary deaeration of the wash water.

A further object of the invention is to provide a method of washing in ultrasonic equipment which is relatively insensitive to the washing temperature.

These and other objects are met by immersing articles to be washed in a solution consisting essentially of water and an agent of the group comprising straight chain alkane sulfonates, alkylbenzene sulfonates having one to three alkyl groups, the alkyl groups together containing from 1 to 3 carbon atoms, or an ethylene oxide condensate of an acid selected from the group consisting of fatty acids and rosin acids, alone or in admixture with other detergents and fillers, while energizing said solution with ultrasonic energy.

Straight chain sulfonates useful in the present invention have the generic formula R—SO$_3$—M, wherein R is a straight chain alkyl radical having from 4 to 18 carbon atoms, and M is an alkali metal or ammonium ion.

The ethylene oxide condensate may be a polyoxyalkylene condensate of a fatty or rosin acid. Suitable compounds may be formed by condensing an average of about 8 to about 20 moles of an alkylene oxide such as ethylene oxide with one mole of an alkylene oxide such as ethylene lauric acid, stearic acid, or tall oil acids.

The alkylaryl sulfonate may be any which is soluble in the washing solution. Suitable compounds include sodium xylene sulfonate, potassium ethylbenzene sulfonate, sodium cumene sulfonate, or sodium toluene sulfonate. Typical cation portions of the alkylaryl sulfonate include the alkali metals, ammonium and the alkaline earth metals.

The foregoing detergents are used in solution. While the concentration is not important, the cleaning efficiency depends to some extent on the concentration of the detergent. The alkane sulfonates are typically used in concentrations greater than about 0.005%, by weight, and the alkylaryl sulfonates are used at concentrations greater than about 0.01%, by weight. These materials may be used at concentrations up to their solubility limits. The ethylene oxide condensates are typically used at concentrations between about 0.003% and about 2%.

By washing according to the method of the present invention in ultrasonic equipment, the temperature dependence of the cleaning efficiency and the deaeration requirements are minimized. It has been discovered that, when agents of the class referred to above are used, efficient cleaning occurs even at relatively low temperatures and without prior deaeration. The ability to obtain efficient cleaning at low temperatures is important, as it improves the suitability of ultrasonic dishwashing for domestic purposes.

The reason for the effectiveness of straight chain alkane sulfonates, short-alkyl-chain alkylaryl sulfonates and ethylene oxide condensates and the ineffectiveness of other recognized detergents is not fully understood. For example, propylene oxide copolymers which are good detergents have very poor cleaning action in ultrasonic dishwashing, apparently for the reason that they prevent resonance from being established in the washer.

On the other hand, alkylaryl sulfonates are not generally considered to be effective detergents alone, yet they are highly effective in ultrasonic dishwashing.

It appears that the agents found to be effective at low temperatures and in the presence of air may have one or more of the following effects on the washing system:

(1) The presence of the agents of the present invention some cases, zeolite softened water. Tests were made at 115° F. and 140° F. Two sets each of the four soiled slides, previously measured for percent transmission, were suspended vertically in the washing solution by clothespins. The ultrasonic generator was turned to peak power and the frequency tuned to maximum resonance. A frequency of about 20,000 cycles per second was used. After cleaning for ten minutes, the soiled slides were removed and air dried. They were measured then for a final percent transmission. The percent soil removed was calculated as follows:

$$\frac{A-B}{100-B} = \text{percent soil removed}$$

where $A$=percent transmission after washing and $B$=percent transmission before washing.

The results of a number of tests using the above procedure are summarized in Table I.

TABLE I

| Type Active | Percent Conc.[1] | Temp., °F. | Water Hardness | Average percent Soil Removed | | | |
|---|---|---|---|---|---|---|---|
| | | | | Oil dag plus Shortening | Lipstick | Baked Sugar plus Egg White | Baked Covo, plus Flour |
| Sodium dodecane sulfonate | .025 | 115 | Zeolite | 97.5 | 99.0 | 79.5 | 87.0 |
| Do | .025 | 140 | do | 89.5 | 89.0 | 64.0 | 67.0   [2] 84.0 |
| Do | .025 | 140 | 180 p.p.m | 86.5 | 73.0 | 48.5 | 88.0   89.0 |

[1] Basis, wt. of washing solution.   [2] Rerun.

may increase the solubility of the air in the water thereby preventing it from forming energy dissipating bubbles, at lower water temperatures e.g., 115° F.;

(2) The agents according to the present invention may keep air from forming bubbles about nuclei particles in the water and thereby keep the bubbles from forming or clumping by an action at the interface between the nuclei particles and the air dissolved in the water thereby retaining the air in solution or of such small bubble size as to render it ineffective to dissipate energy in substantial amounts; or (3) The ultrasonic frequency of the vibrations may increase the concentration of the cleaning agent according to the present invention at the surface or interface being cleaned sufficiently to enable the agent to loosen and remove the dirt particles in the absence of the forces produced by cavitation.

The following examples illustrate the practice of the invention.

Example 1

The low temperature cleaning ability of a cleaning bath consisting of water and a straight chain sulfonate, is illustrated in the following example. Tests were run using glass microscope slides artificially soiled with (a) lipstick, (b) oildag (a colloidal suspension of carbon in a petroleum base) and shortening, (c) baked sugar and egg white, and (d) baked Covo (an unemulsified vegetable shortening) and fluor. A washing solution of the detergent was prepared in the ultrasonic washer using, in Other tests have shown that the addition of the straight chain sulfonates, the xylene sulfonates and the ETO-fatty acid condensates to other detergents greatly improves their ultrasonic washing effectiveness at water temperatures in the range of 100° F. to 125° F. and without deaeration of the water.

Example 2

Slides prepared as described in Example 1 were washed at a resonance frequency of 20,000 c.p.s. at temperatures of 115° F. and 140° F. with a washing solution containing sodium xylene sulfonate. A second group of slides were washed in a solution containing sodium xylene sulfonate and a builder (tripolyphosphate). The results are tabulated below.

TABLE II.—THE EFFECT OF TEMPERATURE AND WATER HARDNESS ON ULTRASONIC CLEANING EFFICIENCY

| Type Active | Percent Conc. | Temp., °F. | Water | Average Percent Soil Removed | | | |
|---|---|---|---|---|---|---|---|
| | | | | Oildag plus Spry | Lipstick | Baked Sugar Plus Egg White | Baked Covo Plus Flour |
| Aromatic Sulfonate: | | | | | | | |
| Sodium | .025 | 115 | Zeolite | 96.0 | 39.0 | 53.5 | 92.0 |
| Xylene | .025 | 140 | do | 94.0 | 92.0 | | 93.5 |
| Sulfonate | .025 | 140 | 180 p.p.m | 90.5 | 62.5 | 56.0 | 88.0 |
| Aromatic Sulfonate plus 40% TPP | .125 | 115 | Zeolite | 95.0 | 91.5 | 96.0 | 97.0 |
| Do | .125 | 140 | do | 97.5 | 95.0 | 95.0 | 96.0 |
| Do | .125 | 140 | 180 p.p.m | 89.5 | 78.0 | 85.0 | 93.0 |

Using sodium xylene sulfonate alone, the washing efficiency was higher for removal of oildag and shortening, about the same for baked flour and Covo, and less for lipstick and baked sugar and egg white at 115° F. than at 140° F. The addition of builder rendered the washing agent at least as effective at 115° F. as at 140° F. in all categories of dirt removal.

Example 3

The same washing test as set forth in Example 1 was made using a tall oil ethylene oxide condensate (1.5 parts by weight of ethylene oxide condensed with 1 part refined tall oil which is equivalent to about 10.5 molar proportions of ethylene oxide per mole of tall oil acids) alone and with 40% builder (tripolyphosphate).

The results are set forth in the following table.

TABLE III.—THE EFFECT OF TEMPERATURE AND WATER HARDNESS ON ULTRASONIC CLEANING EFFICIENCY

| Type Active | Percent Conc. | Temp., °F. | Water | Average Percent Soil Removed | | | |
|---|---|---|---|---|---|---|---|
| | | | | Oildag plus Spry | Lipstick | Baked Sugar Plus Egg White | Baked Covo Plus Flour |
| Fatty Acid, EtO Cond | .025 | 115 | Zeolite | 97.5 | 57.0 | 81.0 | 95.0 |
| Do | .025 | 140 | do | 95.0 | 90.0 | 87.0 | 94.5 |
| Do | .025 | 140 | 180 p.p.m | 94.0 | 68.0 | 75.0 | 94.0 |
| Fatty Acid, EtO Cond. plus 40% TPP | .125 | 115 | Zeolite | 96.5 | 96.5 | 95.5 | 96.0 |
| Do | .125 | 140 | do | 93.5 | 84.5 | 91.5 | 95.5 |
| Do | .125 | 140 | 180 p.p.m | 93.0 | 81.5 | 75.0 | 97.0 |

Where the builder is included the cleaning efficiency is high in all categories of dirt removal at 115° F.

It is to be understood that the foregoing examples are for illustrative purposes only, and that the present invention is not to be limited except by the following claims.

We claim:

1. A method of cleaning soiled household dishes comprising preparing a solution consisting essentially of water and a cleaning agent effective at a water temperature of 100° F. to 125° F. and in the presence of dissolved air in said water, said agent being selected from the group consisting of alkali metal and ammonium straight chain alkane sulfonates, alkali metal, ammonium and alkaline earth metal alkylaryl sulfonates having from 1 to 3 alkyl groups, said alkyl groups together containing from 1 to 3 carbon atoms, and ethylene oxide acid condensates containing 8 to 20 moles of ethylene oxide per mole of acid, said acid being selected from the group consisting of fatty acids and rosin acids, immersing said soiled article in said solution while it is at a temperature of not more than about 125° F., and energizing said solution with ultrasonic energy.

2. A method of cleaning soiled household dishes comprising preparing a solution consisting essentially of water and a cleaning agent effective at a water temperature of 100° F. to 125° F. and in the presence of dissolved air in the water, said agent being selected from the group consisting of ammonium and alkali metal straight chain alkane sulfonates, immersing said soiled article in said solution while it is at a temperature of not more than about 125° F. and energizing said solution with ultrasonic energy.

3. A method of cleaning soiled household dishes comprising preparing a solution consisting essentially of water and from about 0.005% by weight up to the solubility limit of sodium dodecane sulfonate, immersing a soiled article in said solution while it is at a temperature of not more than about 125° F. and energizing said solution with ultrasonic energy.

4. A method of washing soiled household dishes comprising preparing a solution consisting essentially of water and from about 0.01% by weight up to the solubility limit of a sulfonate of the class consisting of alkali metal, ammonium and alkaline earth metal alkylaryl sulfonates having from 1 to 3 alkyl groups, said alkyl groups together containing from 1 to 3 carbon atoms, immersing a soiled article in said solution while it is at a temperature of not more than about 125° F. and energizing said solution with ultrasonic energy.

5. A method of washing soiled household dishes comprising preparing a solution consisting essentially of water and from about 0.003% to about 2% by weight of an ethylene oxide acid condensate wherein the acid is selected from the group consisting of fatty acids and rosin acids, said condensate containing from 8 to 20 moles of ethylene oxide per mole of acid, immersing a soiled article in said solution while it is at a temperature of not more than about 125° F. and energizing said solution with ultrasonic energy.

References Cited

UNITED STATES PATENTS

| | | | |
|---|---|---|---|
| 2,924,542 | 2/1960 | Giammaria | 134—1 |
| 2,961,354 | 11/1960 | Cleveland | 134—1 |
| 2,987,426 | 6/1961 | Shaw | 134—29 XR |
| 3,037,937 | 6/1962 | Harris | 252—137 XR |
| 3,050,422 | 8/1962 | Zak | 134—1 |
| 3,123,553 | 3/1964 | Abrams | 210—37 XR |

OTHER REFERENCES

"Surface Active Agents," by Schwartz et al., 1949, p. 111.

MORRIS O. WOLK, *Primary Examiner.*

S. MARANTZ, *Assistant Examiner.*